April 17, 1934.   B. F. BUCKLER   1,955,111
GENERATOR REGULATION
Filed June 3, 1933   2 Sheets-Sheet 1

Buel F. Buckler
Inventor,
Delos G. Haynes
Attorney

April 17, 1934.  B. F. BUCKLER  1,955,111
GENERATOR REGULATION
Filed June 3, 1933  2 Sheets-Sheet 2

Buel F. Buckler
Inventor
Delos G. Haynes
Attorney

Patented Apr. 17, 1934

1,955,111

UNITED STATES PATENT OFFICE 1,955,111

GENERATOR REGULATION

Buel F. Buckler, Columbia, Mo.

Application June 3, 1933, Serial No. 674,176

6 Claims. (Cl. 171—229)

This invention relates to generators, and with regard to certain more specific features, to alternating current generators.

Among the several objects of the invention may be noted the provision of an alternating current generator adapted to provide under conditions of varying angular velocity a voltage characteristic which is of a more constant nature than heretofore; the provision of a generator of the class described which is of a form which is compact enough for use in connection with automotive vehicles and the like; and the provision of a device of the class described which is simple, automatic and troubleproof in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal section of a generator embodying the invention;

Similar reference characters indicate corresponding parts throughout the several views of the drawings.

The invention relates to the production of constant or at least more constant voltage current by alternating current generators, powered by prime movers having varying angular velocities, so that apparatus such as automobiles and the like may carry equipment such as radios, refrigerators and other devices requiring alternating current, particularly of the 110 volt variety. The automobile thus is provided with means for operating the apparatus set forth and, when idle, said equipment can be connected to a standard lighting circuit to maintain the operation of the said equipment.

Figure 1:
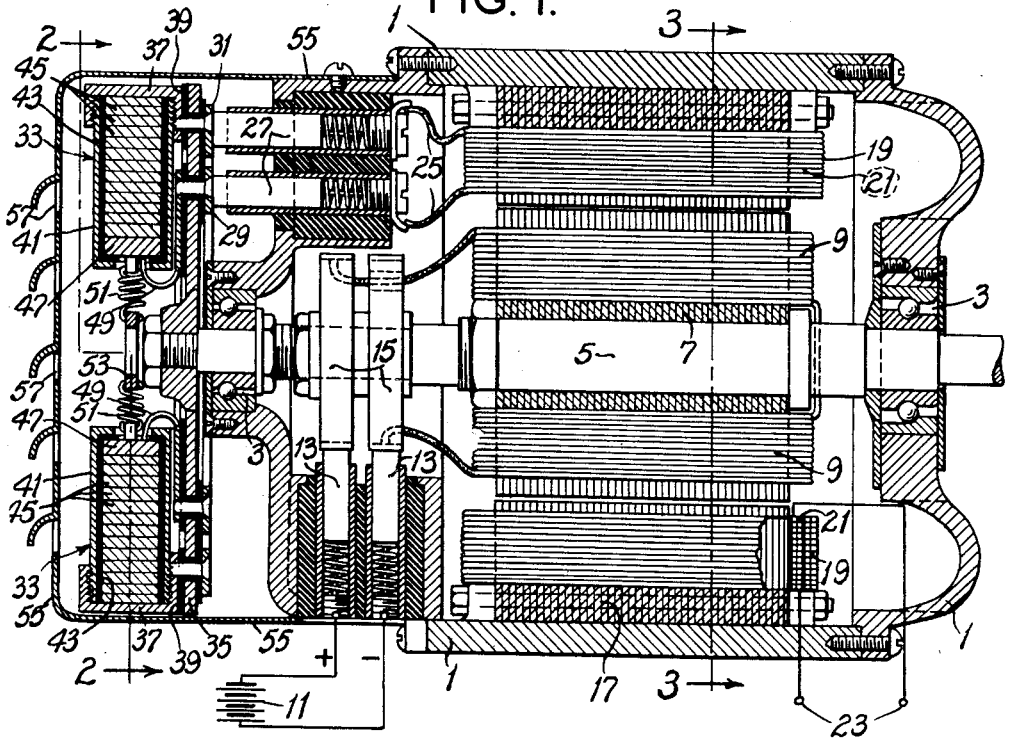
Figure 2:
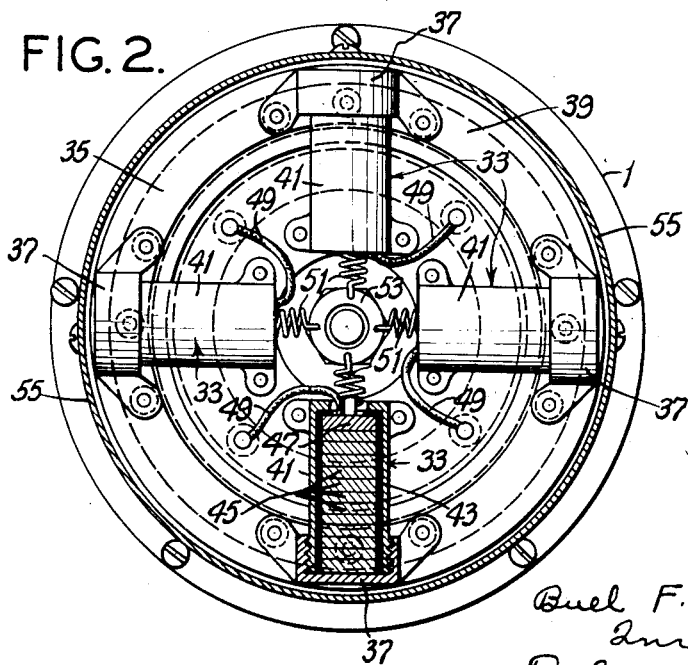
Fig. 2 is a cross section taken on line 2—2 of Fig. 1.
Figure 3:
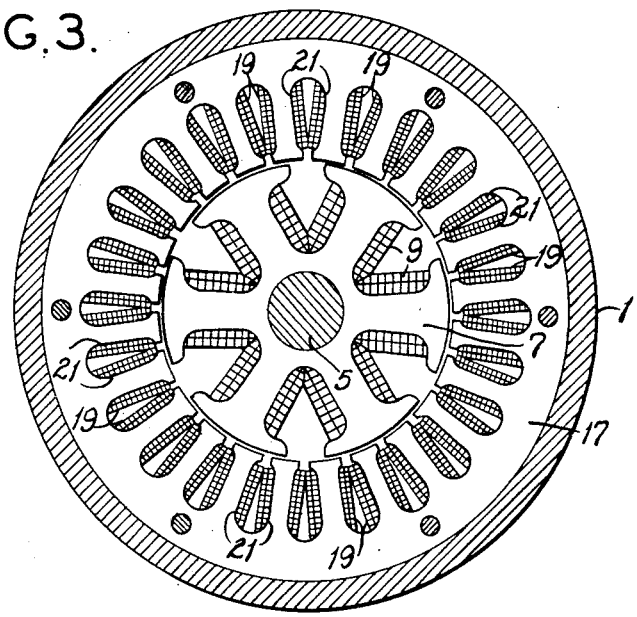
Fig. 3 is a cross section taken on line 3—3 of Fig. 1.

Referring now more particularly to Figs. 1 and 3, there is shown at numeral 1 a case having bearings 3 supporting a shaft 5 which carries a six pole rotating field member 7. It will be understood that alternative numbers of poles may be used and that the poles are formed of known laminated paramagnetic materials.

Field coils 9 (Fig. 1) are wound on the poles of field member 7. The coils 9 are energized by way of brushes 13 and slip rings 15 from a suitable source of current 11, such as a six volt battery. It will be understood that sources of current such as shown at numeral 11 are now available on vehicles.

From the above it will be seen that the shaft 5 supports a fixed-pole rotating field member. It will be understood that the shaft is driven by a suitable mechanical connection to the prime mover of the vehicle (for example, an internal combustion engine) and that the same assumes varying angular velocities in accordance with vehicle speeds and/or transmission shifts.

Figure 4:
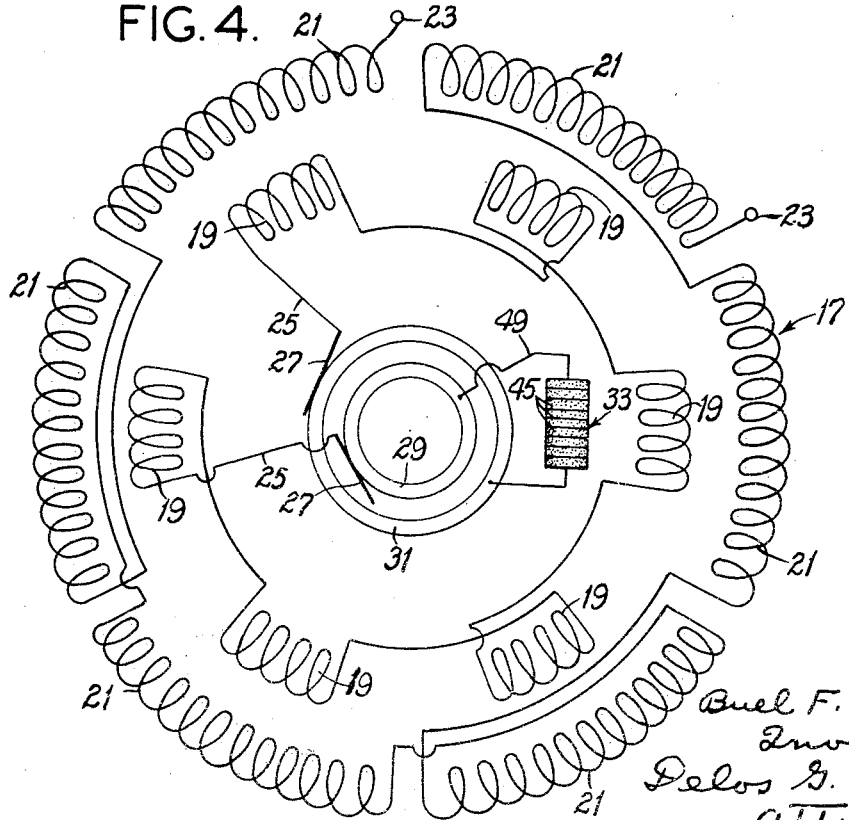
Fig. 4 is a wiring diagram.

The casing 1 supports a stationary laminated armature 17 having stationary armature windings 19 and 21 which are electrically independent of one another, as shown in Fig. 4, but so wound that the voltage generated in each is in time phase with the voltage generated in the other. They differ from one another in the number of turns applied per pole. The windings 19 have relatively fewer and heavier turns than windings 21. Both sets of windings lie in the same slots as shown in Fig. 4, the windings 19 and 21 are wound in the same rotary direction on the respective poles.

The winding 21 will hereinafter be referred to as the working winding, inasmuch as it feeds the terminals 23 of the machine which terminals are connected to the working load, such as a refrigerator, radio or the like. It is the alternating current voltage at the terminals 23 which it is desired to maintain substantially constant, or at least to prevent the wide fluctuations which now inhere according to speed.

The winding 19 will hereinafter be referred to as the compensating winding and is the agency by means of which the terminal voltage of the winding 21 is maintained more constant than is at present known.

Leads 25 and brushes 27 cooperating with slip rings 29 and 31, serve to close the compensating winding circuit through a set of resistors 33. Although these resistors may, and have been, manually controlled or adjusted, it is disclosed herein that they may be centrifugally operated.

The resistors 33 are fastened upon a plate 35 which in turn is supported upon an extension of the shaft 5. The plate 35 rotates with the shaft 5, and carries said slip rings 29 and 31 against which the brushes 27 bear.

Each resistor 33 comprises a conducting head 37 supported on insulation 39 on the plate 35 and electrically connected with the insulated outer slip ring 31. Screwed into the head 37 are holders 41 having insulating linings 43 and carrying therein carbon resistor discs 45. It is to be understood that other material may be used for the discs 45.

A conducting plunger 47 is positioned inwardly of each of the last discs 45 and all of the plungers 47 by means of leads 49, are in electrical contact with the insulated inner slip ring 29.

Springs 51 fastened to the plunger 47 extend radially inwardly to an equalizing ring 53 and tend normally to draw the plunger away from the carbon pile resistors 45, so that maximum resistance is normally set up in said piles. On the other hand, as the speed of the shaft 5 increases, centrifugal force tends to force the plungers 47 outwardly and thus force together the carbon discs so that the resistance of the compensating winding is decreased as the speed increases.

By this means, the compensating effect of the compensating windings is caused to increase as the speed increases. It will be understood that under or over compensation may be corrected by obtaining a suitable carbon pile resistance-pressure characteristic.

A cover 55 having ventilating louvres 57 encloses the centrifugal resistance governing unit.

The operation of the device is as follows:

The shaft 5 is connected with the automotive engine by suitable means such as a gear train, silent chain or the like. It rotates whenever the engine rotates and in some proportion to the engine speed. The magnetic flux from the rotating field member 7 cuts both sets of windings 19 and 21 and generates therein alternating current. The alternating current generated in the working winding 21 is delivered at the terminals 23 and from there it is carried to the apparatus which is to be energized.

The alternating current generated in the compensating winding 19 flows through the resistors 45. The voltages generated in the compensating and working windings 19 and 21 are in time phase with one another.

While I do not wish to limit myself to any particular theory for the explanation of the results obtained from the machine, nevertheless I have found that the low voltage windings 19 function by their association with the high voltage windings 21 as an agency through which the terminal voltage of the working windings is maintained more constant on constant resistance load and under varying speed conditions of a shaft 5 than can be expected without said compensating windings 19.

The self-adjusting resistances 45 across the compensating windings in affecting the current in the compensating windings under varying speed conditions reduce the voltage of the working windings to a predetermined normal, or at least near such a predetermined normal, depending upon the particular design. This is due to the varying mutual inductive effects between windings 19 and 21. It is clear that as the speed increases, the centrifugal force throws the plungers 47 outwardly with more force and thus decreases the resistance at resistors 45 with the result that more current flows in the windings 19 and the mutual inductive effects of this current in the working windings and in the compensating windings, compensates in said working windings for any tendency for the voltage to rise abnormally at said terminals 23.

It is to be understood that whether or not exact constancy of voltage is attained is a matter of design constants. It is also to be understood that manual operation, instead of centrifugal operation of resistors 45 may be effected. In such case, the leads 25 would merely be led to an outside adjustable resistance. Manual operation may be desirable where output voltage is not only to be maintained constant, but to be varied according to certain predeterminations.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A generator comprising means for effecting a flux field, a working winding, a compensating winding, said windings being both substantially exposed to cutting by the flux field, means for effecting relative movement between said field on the one hand and said working and compensating winding on the other hand, said compensating winding being arranged with respect to the working winding such that voltage across the working winding is reduced by increase of current in the compensating winding, and means for automatically controlling said current comprising a variable resistance adapted to change in response to speed change.

2. A generator comprising means for effecting a flux field, a working winding, a compensating winding, said windings being both substantially exposed to cutting by the flux field, means for effecting relative movement between said field on the one hand and said working and compensating winding on the other hand, said compensating winding being arranged with respect to the working winding such that voltage across the working winding is reduced by increase of current in the compensating winding, and means for increasing said current according to increase in said relative speed.

3. A generator comprising means for effecting a flux field, a working winding, a compensating winding, said windings being both substantially exposed to cutting by the flux field, means for effecting relative movement between said field on the one hand and said working and compensating winding on the other hand, said compensating winding being arranged with respect to the working winding such that the voltage across the working winding is reduced by increase of current in the compensating winding, and variable resistance means in the compensating winding circuit for increasing said current according to increase in said relative speed, said increase in current being effected by decrease in resistance in the compensating winding circuit, and means responsive to increase in said relative speed adapted to effect said decrease in said resistance.

4. An alternating generator comprising a rotating field member, a plurality of cooperating and stationary armature windings, one of which comprises a working winding and the other of which comprises a compensating winding, said windings being both substantially exposed to cutting by the flux field, a working circuit connected with the working winding, and a resistance circuit connected with the compensating winding, a variable resistance in said resistance circuit, and centrifugal means driven at a velocity according to the velocity of said rotating field member adapted to decrease said resistance as the speed of the field member increases and increasing said resistance as said speed decreases.

5. In an alternating current generator, a casing, a rotating shaft therein, a field member on said shaft, means for electrically energizing said field member to effect a magnetic field which is rotatable with the field member, a stationary armature having slots, working windings in said slots, electrically separate compensating windings in said slots, said working and compensating windings being all substantially exposed to cutting by the magnetic field, a working circuit connected with the working windings, a resistance circuit connected with said compensating windings, a variable resistor in the compensating winding circuit, and centrifugally responsive means mounted to rotate in a proportion to the speed of said field member, adapted upon increase in speed to decrease the resistance and vice versa.

6. In an alternating current generator, a casing, a rotating shaft therein, a field member on said shaft, means for electrically energizing said field member to effect a magnetic field which is rotatable with the field member, a stationary armature having slots, working windings in said slots, electrically separate compensating windings in said slots, said working and compensating windings being all substantially exposed to cutting by the magnetic field, the compensating and working windings being wound in the same series, a working circuit connected with the working windings, a resistance circuit connected with said compensating windings, variable resistors connected in series in the compensating resistance circuit, said resistances comprising resistance piles mounted to rotate according to the speed of said field whereby increase in speed decreases the resistance and vice versa.

BUEL F. BUCKLER.